United States Patent
Smrcka

[11] 3,872,609
[45] Mar. 25, 1975

[54] RESUSCITATION TRAINING DUMMY
[75] Inventor: Joseph G. Smrcka, Norwalk, Conn.
[73] Assignee: Alderson Research Laboratories, Inc., Stamford, Conn.
[22] Filed: Nov. 26, 1973
[21] Appl. No.: 419,145

[52] U.S. Cl. .............................. 35/17, 264/DIG. 14
[51] Int. Cl. .......................................... G09b 23/32
[58] Field of Search ................. 35/17; 264/DIG. 14; 223/66

[56] References Cited
UNITED STATES PATENTS

| | | |
|---|---|---|
| 3,199,225 | 8/1965 | Robertson ............................. 35/17 |
| 3,209,469 | 10/1965 | James .................................... 35/17 |
| 3,310,885 | 3/1967 | Alderson ............................... 35/17 |
| 3,562,925 | 2/1971 | Baermann .............................. 35/17 |
| 3,642,965 | 2/1972 | Nuttall ..................... 264/DIG. 14 X |

Primary Examiner—Harland S. Skogquist
Attorney, Agent, or Firm—Buckles and Bramblett

[57] ABSTRACT

A training dummy for teaching resuscitation by both external cardiac massage and mouth-to-mouth resuscitation. The chest section is easily inserted into, and removed from, the remainder of the torso and, when removed, exposes all operative elements. Compression of the chest closes switches in the artificial heart to indicate the proper degree of force. For mouth-to-mouth resuscitation, an inflatable lung bladder causes the chest to rise and fall.

13 Claims, 5 Drawing Figures

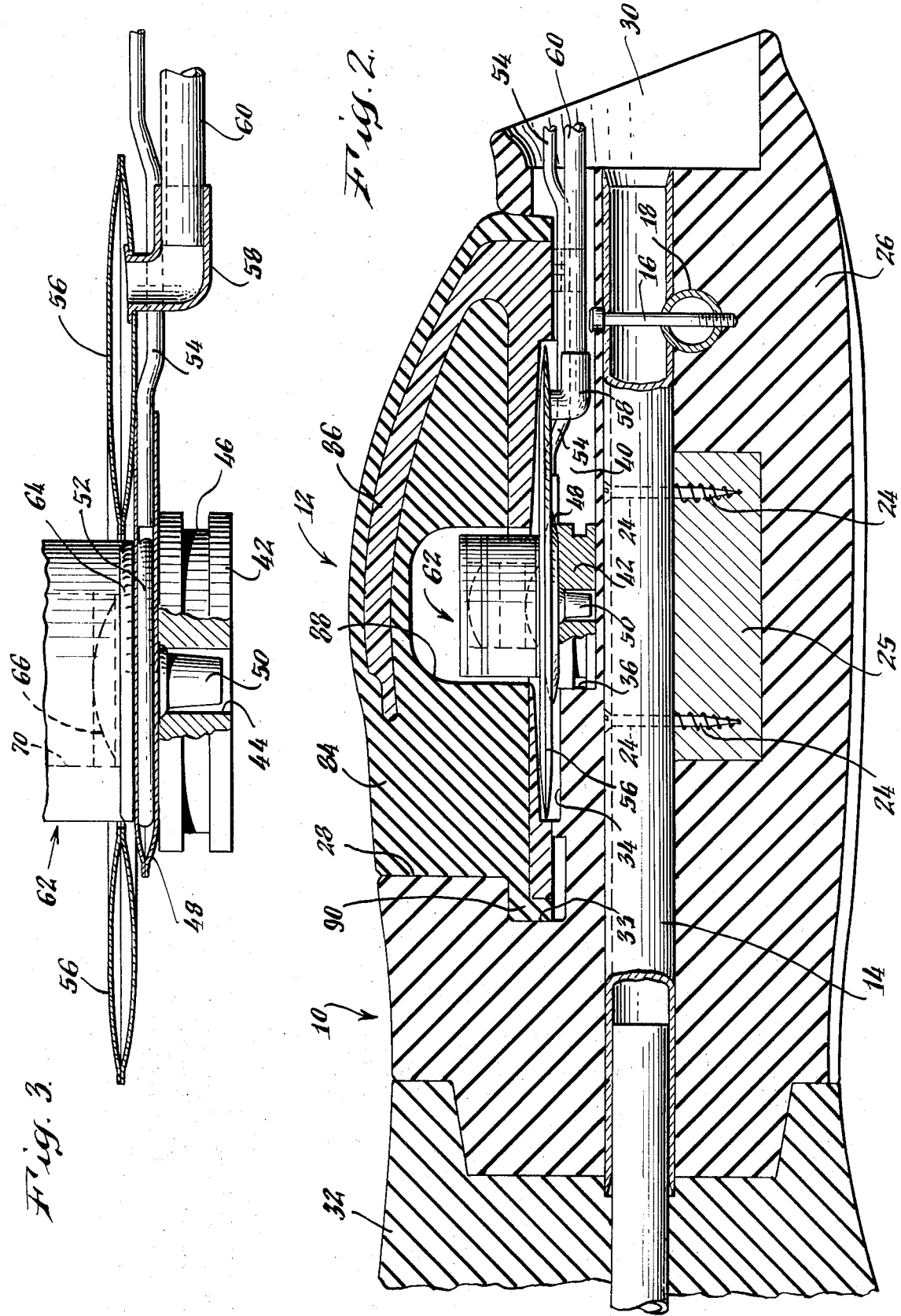

RESUSCITATION TRAINING DUMMY

BACKGROUND OF THE INVENTION

A number of manikins are available in the prior art for teaching cardiopulmonary resuscitation (CPR). However, these manikins are generally characterized by complex construction and the fact that most of the controls and simulated vital organs are not readily available for repair, replacement, and cleaning. A further problem with such manikins is that they do not have the chest compression characteristics and "feel" of a human body. The latter is important because correct placement of the hands in cardiac massage is assured by such body "landmarks" as the nipples and ribs. While a number of prior art dummies include nipples, they do not include a realistically feeling rib cage. Accordingly, it is a primary object of the present invention to provide a CPR training dummy which is of simpler construction and wherein all vital organs are readily exposed. Another object is to provide such a dummy which has a chest and rib cage construction whose feel closely approximates that of a human chest. Another object is to provide such a dummy with a chest having compression characteristics closely resembling that of a human chest. The manner in which these objects are achieved will become more apparent from the following description and appended claims.

SUMMARY OF THE INVENTION

There is provided a torso for a first aid training dummy which comprises a molded main body member simulating the back, lower torso, and shoulder areas of a human. The main body member defines a recess in the chest portion and a keyway in the lower portion of the recess. A rod extends vertically and centrally through the main body member closely adjacent the rear surface of the recess. An artificial body organ is positioned in the recess. A removable chest member is mounted within the recess and encloses the organ. The chest member includes a key engaging the keyway.

BRIEF DESCRIPTION OF THE DRAWINGS

FIG. 2 is a cross section taken substantially along the line 2—2 of FIG. 1;

FIG. 3 is an enlarged view, partially in cross section, showing the construction of the artificial organs of the invention;

DESCRIPTION OF THE PREFERRED EMBODIMENT

As used in the following description, the terms "vertical," "horizontal," "top," "bottom", etc. are referenced to a standing human figure. For training purposes, however, the manikin will normally be horizontal.

Figure 1:
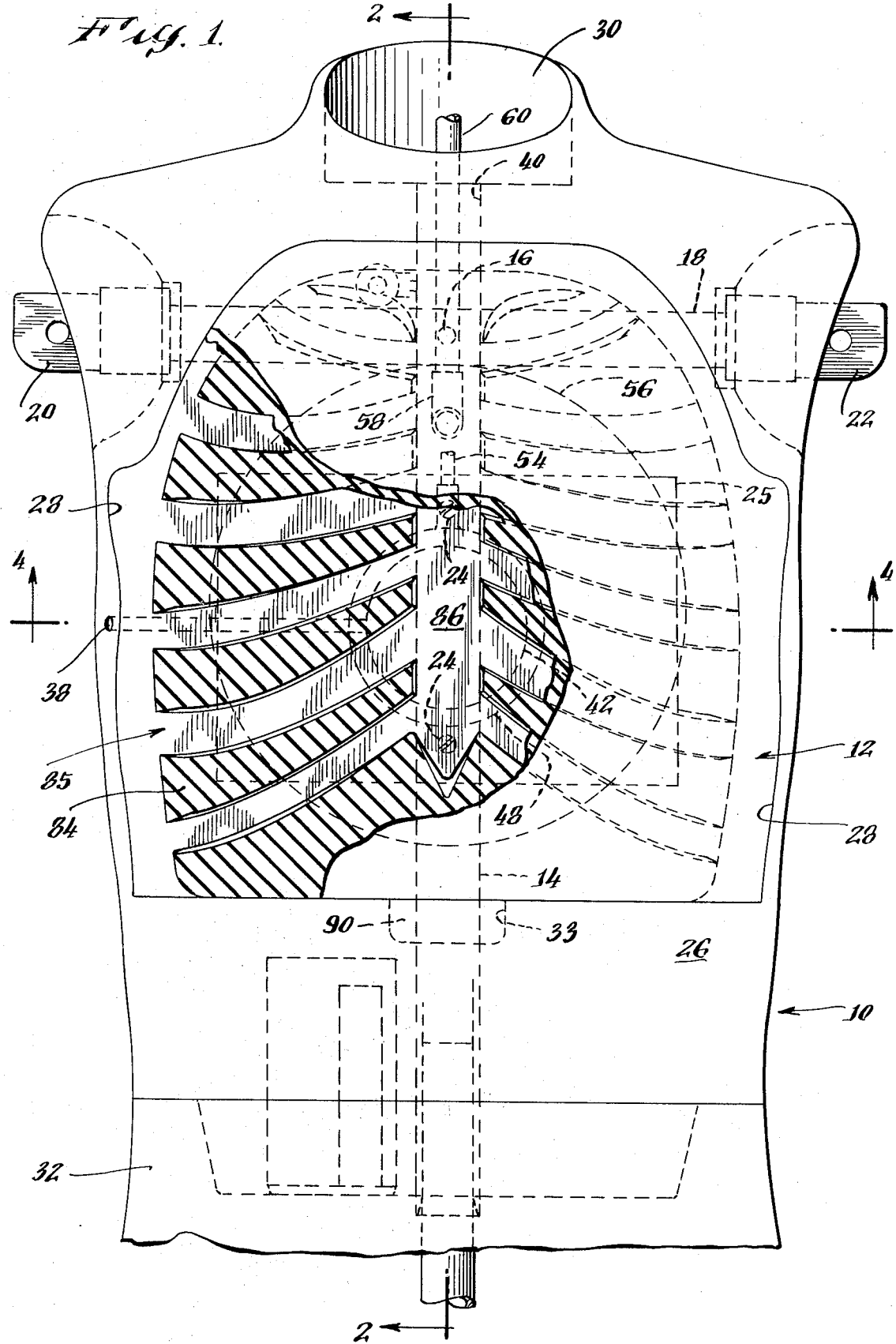
FIG. 1 is a top view of the dummy torso of this invention.
Figure 4:
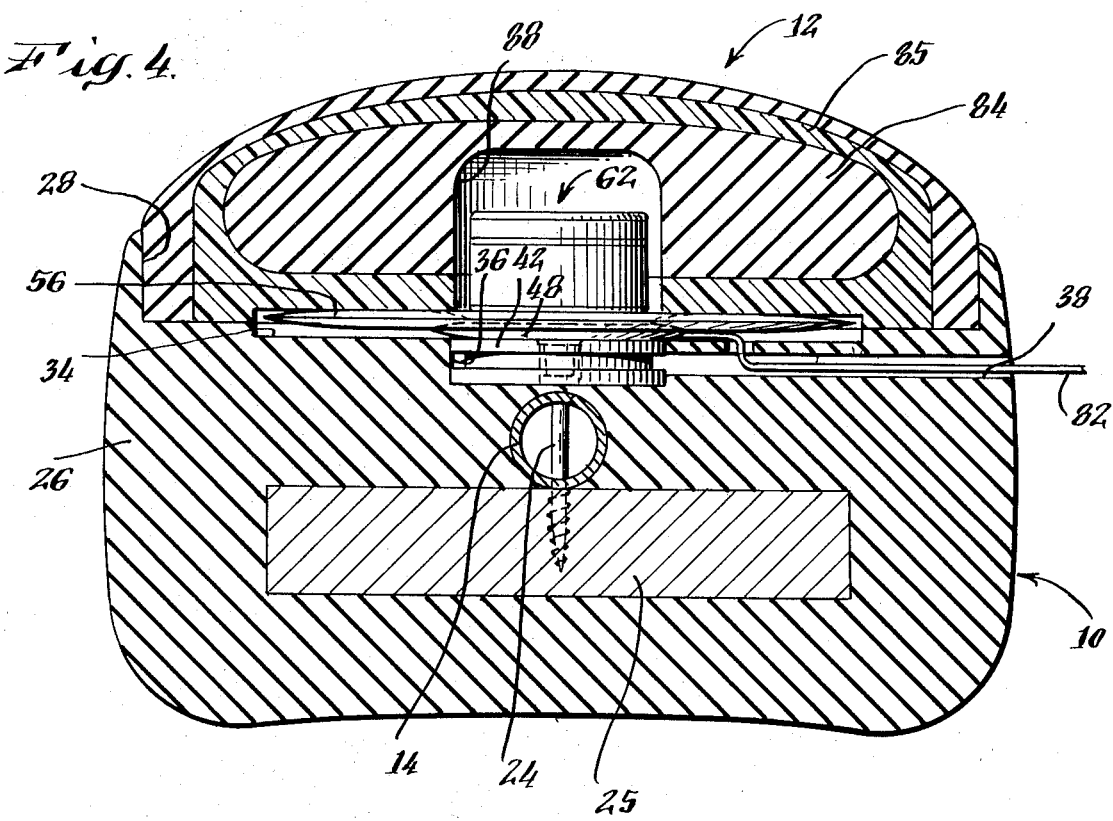
FIG. 4 is a cross section taken substantially along the line 4—4 of FIG. 1.

With particular reference to FIGS. 1, 2, and 4 of the drawings, there is illustrated a training dummy torso comprising a main body portion 10 and a removable chest 12. The main body portion includes a skeletal framework comprising a vertically extending pipe 14 secured by means of a bolt 16 to a horizontal shoulder rod 18. The shoulder rod terminates at suitable arm attachments 20, 22 which do not form a part of this invention and need not be further described. The pipe 14 is secured by means of screws 24 to a wooden block 25.

Around the basic skeletal framework is molded an integral-skin plastic foam 26. Foam 26 is molded in such a fashion as to externally resemble the contours of the human torso, except for a recess 28 in the chest region. As will be seen from FIG. 1, the recess 28 is essentially flat across the bottom but otherwise substantially follows the outline of the rib cage. The upper end of the torso is designed with a socket 30 for receiving a head and neck assembly and the lower end is shaped to mate with a lower body member 32. At the bottom and rear of recess 28 there is provided a keyway 33 which is substantially rectangular in cross section.

Figure 5:
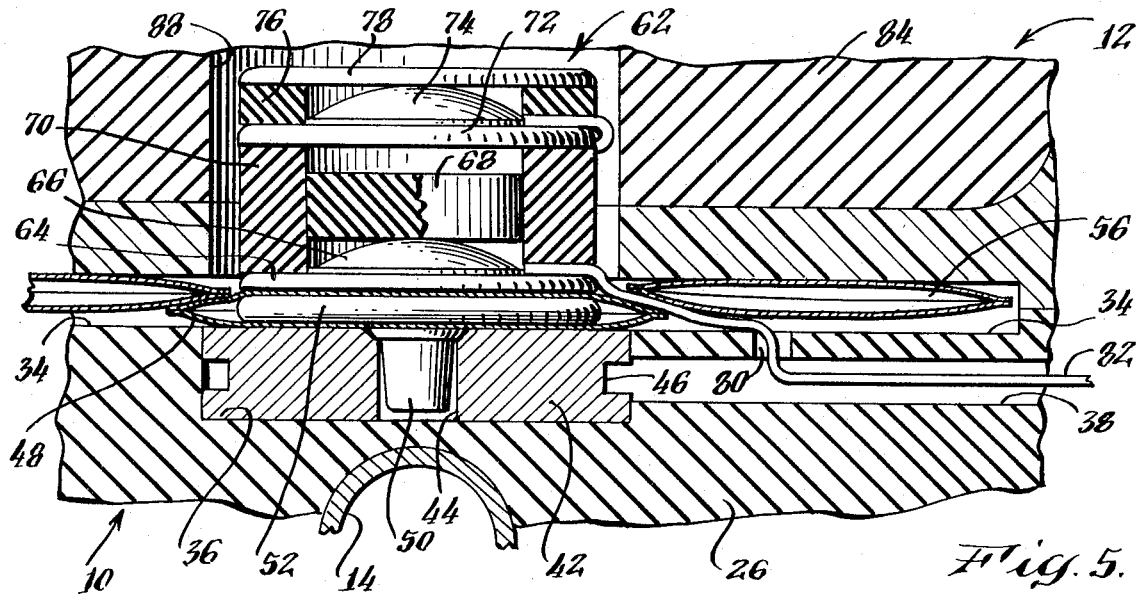
FIG. 5 is an enlarged view, in cross section, of a portion of FIG. 4.

The back of recess 28 is shaped so as to form a relatively shallow circular depression 34. At the center of depression 34 is a well 36 which is relatively close to the pipe 14. A transverse tunnel 38 extends from the manikin's side to well 36 and a vertical guideway 40 extends from the well to the neck socket 30. Positioned in the well 36 is a metal disc 42 having a central hole 44 and a peripheral groove 46 (FIG. 5). Positioned against the disc 42 is a small circular rubber bladder 48 which is held in place by means of a cemented stud 50 extending into the hole 44. The bladder 48 is normally held open by a resilient foam insert 52. Extending outwardly from bladder 48 is a flexible tube 54 which passes through guideway 40 and connects in known manner to a pair of simulated arteries in the dummy's neck. An annular lung bladder 56 is positioned in the depression 34 surrounding small bladder 48. Its interior is connected by means of an elbow 58 and a tube 60 in known manner to the mouth and nasal cavity contained in the head.

Mounted atop the small bladder 48 is a cylindrical heart unit 62. Its construction will be apparent from FIG. 5. It comprises a lower circular metal plate 64, to the center of which is cemented a circular, commercially available, pressure switch 66. On top of pressure switch 66 is a compression pad 68 of resilient foam. Surrounding the pressure switch 66 and the resilient pad 68 is a foam cylinder 70. Closing the top of the foam cylinder 70 is a second circular plate 72. A second pressure switch 74 is cemented to the center of plate 72 and is surrounded by a compression ring 76 of resilient foam. The top of ring 76 is closed by a third plate 78. Wires from the switches 66, 74 extend through the foam and through an opening 80 and tunnel 38 in a flexible cable 82 which passes out the side of the dummy.

All of the operating mechanism just described is enclosed by the removable chest 12. It is molded from an integral skin foam 84 into which is molded a simulated rib cage 85 and sternum 86 made of a tough resilient plastic. In ths manner, the ribs may be easily felt within the softer simulated flesh formed by the foam. The similarity to the human chest also results in similar compression characteristics. The foam defines a recess 88 which surrounds and encloses the heart unit 62 but is spaced some distance above it. The removable chest 12 is also provided with a key 90 designed to engage the keyway 33 in the main body portion 10.

In the practice of external heart massage, it is important that pressure be applied directly over the sternum. If pressure is applied to either side, the massage action is less efficient and damage may be done to the patient's ribs. Furthermore, it is important that at least 80 pounds force be applied but not more than 120 pounds. The dummy of this invention is designed to teach both of these factors. The resiliency of the rib cage and foam is very nearly that of the human body and is so designed that when 80 pounds force is applied directly downwardly on the sternum over the heart unit, the chest foam will engage the upper plate 78 of the heart unit and close the pressure switch 74. This switch is connected by its external wiring to a green light which indicates proper pressure. If additional force is applied, it is transmitted through the foam cylinder 70 and the compression pad 68 to the lower switch 66 which is designed to close upon an overall applied force of 120 pounds. This switch is wired externally to a red light which indicates excessive pressure.

Proper placement of the pressure is taught by the solid disc 42 which is positioned directly over the pipe 14 as shown in FIG. 5. Since the foam 26 is resilient, the disc 42 will tend to pivot on pipe 14 if force is applied to one side or the other. This makes it more difficult for the switches to close.

The small round bladder 48 directly beneath the heart unit is held normally open by foam insert 52 and is connected by the tube 54 to a pair of simulated carotid arteries in the neck in the form of small balloon-like tubes. Proper massage action forces air from bladder 52 into these simulated arteries causing them to expand and contract in a lifelike manner.

In the teaching of mouth-to-mouth resuscitation, the student blows into the mouth and nasal cavities and this air passes through tube 60 into the annular lung bladder 56 thus causing this bladder to expand. The removable chest 12 is not secured to the main body portion 10 except by the key 90 in keyway 33. Accordingly, the upper portion of the chest will rise and fall in a realistic manner. The chest is easily removed for access to the simulated internal organs by simply pulling the upper portion outwardly and removing the key 90 from the keyway 33. Reversing this operation enables it to be replaced.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. A torso for a first aid training dummy which comprises: a molded main body member simulating the back, lower torso, and shoulder areas of a human, said main body member defining a recess in the chest portion thereof and a keyway in the lower portion of said recess; a rod extending vertically and centrally through said main body member closely adjacent the rear surface of said recess; an artificial body organ in said recess; and a resilient removable chest member within said recess and enclosing said organ, said chest member including a key engaging said keyway.

2. The torso of claim 1 wherein said body organ comprises a resilient body enclosing a least one electrical pressure switch.

3. The torso of claim 2 wherein said body organ comprises a backup plate intermediate said resilient body and said vertical rod and substantially centered on said rod.

4. The torso of claim 3 wherein said body organ comprises a bladder intermediate said resilient body and said backup plate.

5. The torso of claim 1 wherein said body organ comprises a resilient body enclosing first and second spaced electrical pressure switches separated by a resilient mass therebetween.

6. The torso of claim 1 wherein said body organ comprises an inflatable bladder positioned to lift said chest member upon inflation.

7. A torso for a first aid training dummy comprising: a main body member simulating the back, lower torso, and shoulder areas of a human, said main body member defining a recess in the chest portion thereof; a rod extending vertically and centrally through said main body member closely adjacent the rear surface of said recess; an assembly of artificial body organs within said recess; and a resilient removable chest hingedly engaged with said main body member at the bottom of said recess.

8. The torso of claim 7 wherein said assembly comprises: a resilient body enclosing first and second spaced electrical pressure switches separated by a resilient mass therebetween, said resilient body being substantially centered on said rod.

9. The torso of claim 8 wherein said assembly comprises: a lung simulating bladder positioned to lift said chest member upon inflation.

10. The torso of claim 9 wherein said assembly comprises: a second bladder intermediate said resilient body and said rod.

11. In a dummy torso for first aid training having a main body member simulating at least the back and shoulder areas of a human and a movable chest member, the improvement which comprises: said chest member being formed of a relatively hard, resilient simulated rib cage molded within a relatively softer simulated flesh, said rib cage being positioned to be manually detected through said flesh by a trainee to teach proper hand placement.

12. The improvement of claim 11 wherein said flesh is a plastic foam.

13. The improvement of claim 12 wherein said rib cage is plastic.

* * * * *